(12) United States Patent
Kwon et al.

(10) Patent No.: US 7,986,386 B2
(45) Date of Patent: Jul. 26, 2011

(54) DISPLAY SUBSTRATE, METHOD OF MANUFACTURING THE DISPLAY SUBSTRATE AND LIQUID CRYSTAL DISPLAY DEVICE HAVING THE DISPLAY SUBSTRATE

(75) Inventors: Oh-Jeong Kwon, Suwon-si (KR); Hyeok-Jin Lee, Seongnam-si (KR); Hong-Jo Park, Suwon-si (KR); Sung-Jae Yun, Sangju-si (KR); Hee-Seop Kim, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 310 days.

(21) Appl. No.: 12/416,671

(22) Filed: Apr. 1, 2009

(65) Prior Publication Data

US 2010/0007825 A1    Jan. 14, 2010

(51) Int. Cl.
  *G02F 1/1335*    (2006.01)
(52) U.S. Cl. ...................................... 349/114
(58) Field of Classification Search ............... None
  See application file for complete search history.

(56) References Cited

U.S. PATENT DOCUMENTS

| | | | |
|---|---|---|---|
| 2006/0170864 A1 | 8/2006 | Kuiper et al. | |
| 2009/0059109 A1* | 3/2009 | Choi et al. | 349/39 |
| 2010/0110351 A1* | 5/2010 | Kim et al. | 349/114 |
| 2010/0134732 A1* | 6/2010 | Cho et al. | 349/110 |
| 2010/0134734 A1* | 6/2010 | Kim et al. | 349/114 |
| 2010/0328591 A1* | 12/2010 | Oh et al. | 349/114 |

OTHER PUBLICATIONS

European Search Report.
Michiaki Sakamoto, et al., "L-6 Late-News Paper: Development of the Novel Transflective LCD Module Using Super-Fine-TFT Technology," SID 2006, 2006 SID International Symposium, Society for Information Display, LO., vol. XXXVII, May 24, 2005, pp. 1669-1671.
You-Jin Lee, et al. "P-162: Transflective LCD in a Patterned Vertically Alligned Mode With a Single Cell Gap," SID 2006, 2006 SID International Symposium, Society for Information Display, LO., vol. XXXVII, May 24, 2005, pp. 821-824.

* cited by examiner

*Primary Examiner* — Sung H Pak
(74) *Attorney, Agent, or Firm* — F. Chau & Associates, LLC

(57) ABSTRACT

A base substrate includes a transmissive area and a reflective area. An insulation layer is formed on the base substrate to have an embossed pattern in correspondence with the transmissive area. A first pixel electrode includes a first transmissive electrode formed on the insulation layer of the embossed pattern, and a first reflective electrode formed on the base substrate in correspondence with the reflective area. A second pixel electrode includes a second transmissive electrode formed on the insulation layer of the embossed pattern corresponding to the transmissive area, and a second reflective electrode corresponding to the reflective area.

20 Claims, 12 Drawing Sheets

DISPLAY SUBSTRATE, METHOD OF MANUFACTURING THE DISPLAY SUBSTRATE AND LIQUID CRYSTAL DISPLAY DEVICE HAVING THE DISPLAY SUBSTRATE

PRIORITY STATEMENT

This application claims priority under 35 U.S.C. §119 to Korean Patent Application No. 2008-66000, filed on Jul. 8, 2008 in the Korean Intellectual Property Office (KIPO), the contents of which are herein incorporated by reference in their entirety.

BACKGROUND OF THE INVENTION

1. Field of the Invention

Exemplary embodiments of the present invention relate to a display substrate, a method of manufacturing the display substrate and a liquid crystal display (LCD) device having the display substrate, and more particularly to a display substrate having enhanced display quality, a method of manufacturing the display substrate and an LCD device having the display substrate.

2. Description of Related Art

Generally, in a transflective-type liquid crystal display (LCD) device, a transmissive electrode and a reflective electrode are separately formed in one pixel area, and a signal is applied to the transmissive electrode and the reflective electrode through a thin-film transistor (TFT). A liquid crystal cell in a transmissive area alters the phase of incident light by a ½λ retardation. In a reflective area, the transmission length is twice that of a cell gap. Thus, the cell gap in the reflective area may be half that of a cell gap in the transmissive area, so that the phase of incident light in the reflective area is altered by a ¼λ retardation.

In a general multi-cell gap mode, a cell gap of a reflective area is less than a cell gap in a transmissive area. For example, steps are formed on a TFT substrate or a color filter substrate so that the cell gap in the reflective area is less than the cell gap in the transmissive area.

The multi-cell gap mode may be implemented in a transflective-type LCD device. However, the multi-cell gap LCD device is susceptible to defects generated during a manufacturing process. For example, alignment layer deposition defects caused by the steps of the reflective area, alignment defects such as polyimide agglomeration, and texture defects may occur. In particular, bruising of liquid crystal may occur, and contrast ratio (CR) may be decreased. Moreover, the number of mask manufacturing processes may be increased, and manufacturing costs may be increased.

SUMMARY OF THE INVENTION

According to an embodiment of the present invention, a display substrate includes a base substrate, an insulation layer, a first pixel electrode and a second pixel electrode. The base substrate includes a transmissive area and a reflective area. The insulation layer is formed on the base substrate and including an embossed pattern in correspondence with the transmissive area. The first pixel electrode includes a first transmissive electrode formed on the insulation layer of the embossed pattern in correspondence with the transmissive area, and a first reflective electrode formed above the base substrate in correspondence with the reflective area. The second pixel electrode includes a second transmissive electrode formed on the insulation layer of the embossed pattern in correspondence with the transmissive area, and a second reflective electrode in correspondence with the reflective area.

According to an embodiment of the present invention, the display substrate may further include a color filter layer formed on the base substrate in correspondence with the transmissive area and the reflective area, respectively. The insulation layer may be formed on the color filter corresponding to the transmissive area.

According to an embodiment of the present invention, the insulation layer may be a color filter layer including an embossed pattern in correspondence with the transmissive area, and a flat portion in correspondence with the reflective area. The thickness of the color filter layer corresponding to the transmissive area may be substantially equal to that of the color filter corresponding to the reflective area.

According to an embodiment of the present invention, there is provided a method of manufacturing a display substrate. In the method, a base substrate including a transmissive area and a reflective area is provided. An insulation layer including an embossed pattern is formed on the base substrate in correspondence with the transmissive area. A first pixel electrode including a first transmissive electrode and a first reflective electrode is formed. The first transmissive electrode is formed on the insulation layer of the embossed pattern in correspondence with the transmissive area. The first reflective electrode on the base substrate is formed on the base substrate in correspondence with the reflective area. A second pixel electrode includes a second transmissive electrode and a second reflective electrode. The second transmissive electrode is formed on the insulation layer of the embossed pattern corresponding to the transmissive area. The second reflective electrode is formed on the base substrate in correspondence with the reflective area.

According to an embodiment of the present invention, a color filter layer may further be formed on the base substrate in correspondence with the transmissive and reflective areas. The insulation layer may be formed in an area of the color filter layer. A reflective layer may further be disposed between the base substrate and the color filter layer in correspondence with the reflective area.

According to an embodiment of the present invention, the insulation layer may be a color filter including an embossed pattern in correspondence with the transmissive area, and a flat portion in correspondence with the reflective area. A thickness of the color filter layer corresponding to the transmissive area may be substantially the same as a thickness of the color filter layer corresponding to the reflective area.

According to an embodiment of the present invention, an LCD device includes a display substrate, an opposite substrate and a liquid crystal layer. The display substrate includes a base substrate including a transmissive area and a reflective area, an insulation layer having an embossed pattern in correspondence with the transmissive area being formed on the base substrate, a first pixel electrode including a first transmissive electrode formed on the embossed pattern and a first reflective electrode formed on the base substrate in correspondence with the reflective area, and a second pixel electrode including a second transmissive electrode formed on the embossed pattern and second reflective electrode on the base substrate in correspondence with the reflective area. The opposite substrate faces the display substrate. The liquid crystal layer is disposed between the opposite substrate and the display substrate, and includes a liquid crystal medium.

According to an embodiment of the present invention, a cell gap of the liquid crystal layer corresponding to the transmissive area may be substantially the same as a cell gap of the liquid crystal layer corresponding to the reflective area.

According to an embodiment of the present invention, the liquid crystal medium may be in an optical isotropic state when an electric field is not applied between the first pixel electrode and the second pixel electrode, and the liquid crystal medium may be in an optical anisotropic state when an electric field is applied between the first pixel electrode and the second pixel electrode. The magnitude of the electric field corresponding to the transmissive area may be about twice that of the electric field corresponding to the reflective area due to the embossed pattern of the insulation layer.

According to an embodiment of the present invention, a retardation of the liquid crystal corresponding to the transmissive area may be about half a retardation of the liquid crystal layer corresponding to the reflective area.

According to an embodiment of the present invention, a magnitude of an electric field in correspondence with a transmissive region may be about twice that of the magnitude of an electric field in correspondence with a reflective region and a mono-cell gap may be implemented in the LCD device. Moreover, a liquid crystal layer has a liquid crystal medium of an optical anisotropic state, so that a viewing angle and a response time of the LCD device may be enhanced.

BRIEF DESCRIPTION OF THE DRAWINGS

The present invention will become more apparent by describing in detailed example embodiments thereof with reference to the accompanying drawings.

DETAILED DESCRIPTION OF EXEMPLARY EMBODIMENTS

Figure 1:
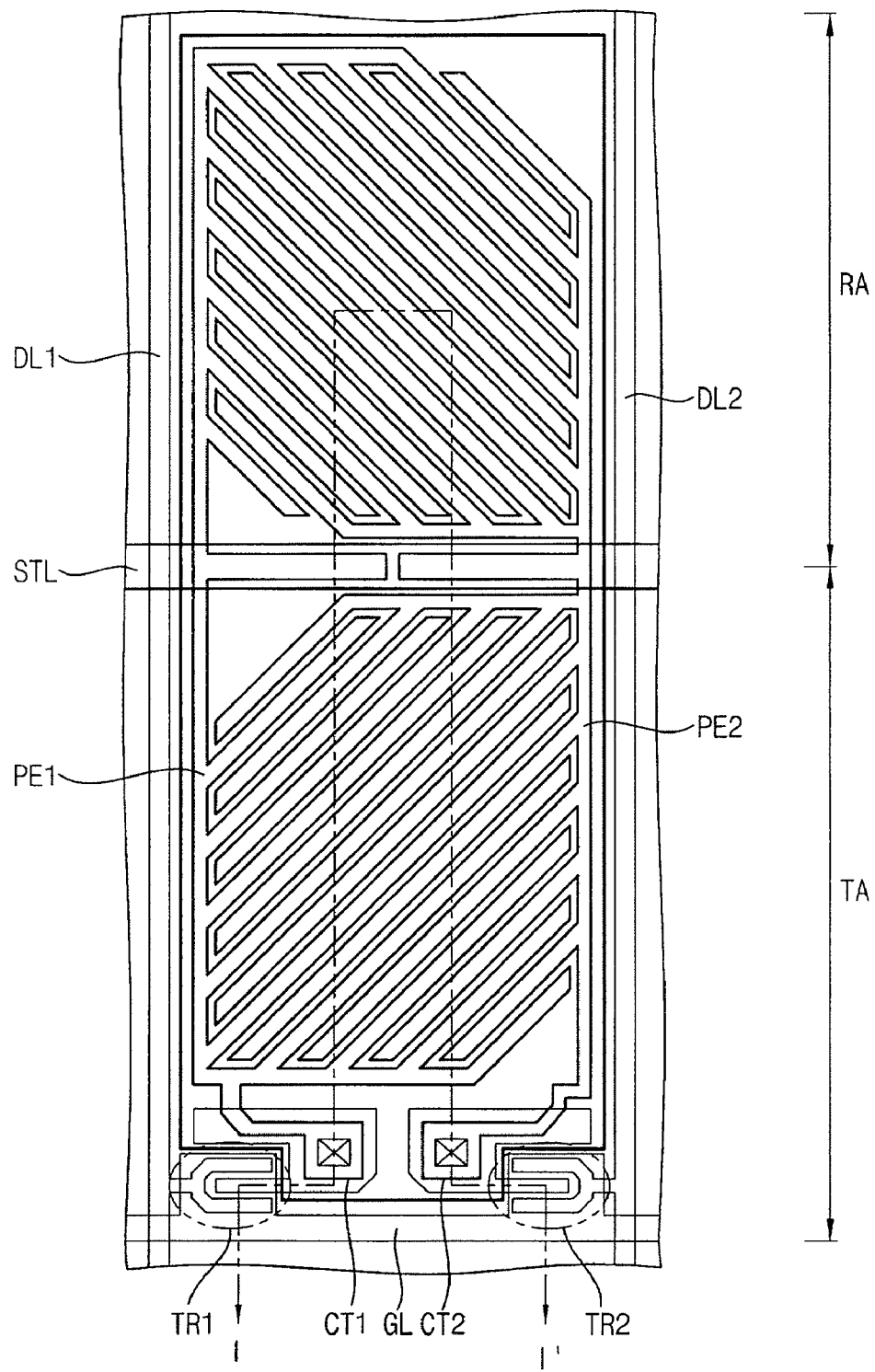
FIG. 1 is a plan view illustrating a liquid crystal display (LCD) device according to an exemplary embodiment of the present invention.

The present invention is described more fully hereinafter with reference to the accompanying drawings, in which exemplary embodiments of the present invention are shown. The present invention may, however, be embodied in many different forms and should not be construed as limited to exemplary embodiments set forth herein. Rather, exemplary embodiments are provided so that this disclosure will be thorough and complete, and will fully convey the scope of the present invention to those skilled in the art. In the drawings, the sizes and relative sizes of layers and regions may be exaggerated for clarity.

Figure 2:
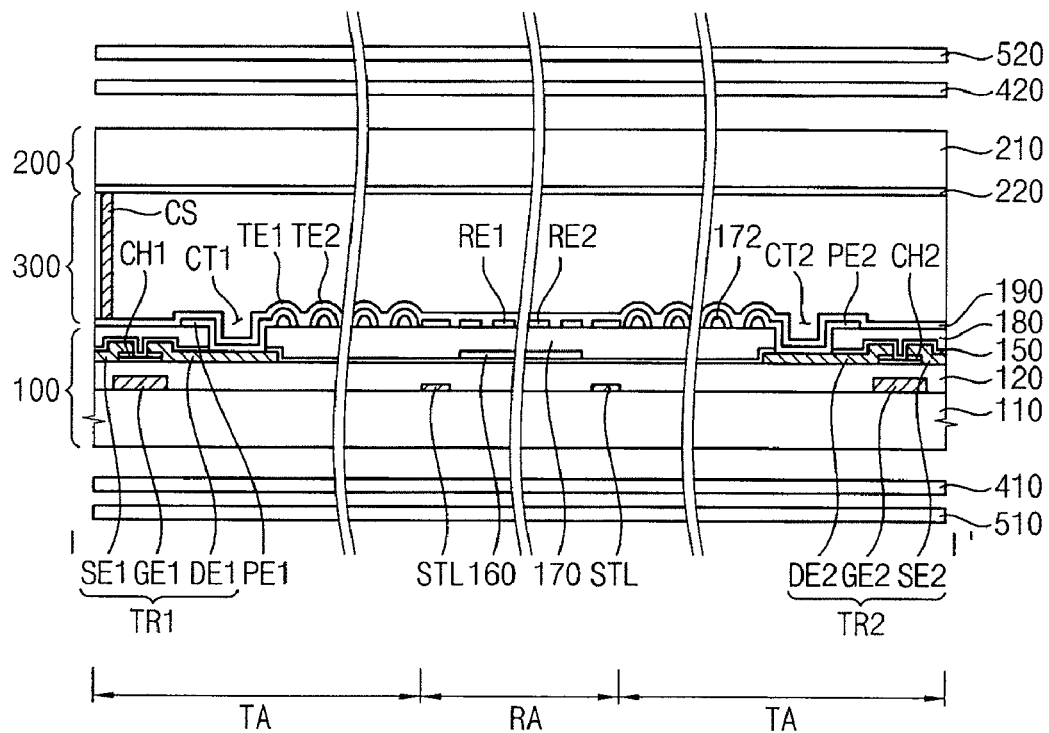
FIG. 2 is a cross-sectional view taken along a line I-I' in FIG. 1.

FIG. 1 is a plan view illustrating a liquid crystal display (LCD) device according to an exemplary embodiment of the present invention. FIG. 2 is a cross-sectional view taken along a line I-I' in FIG. 1.

Referring to FIGS. 1 and 2, the LCD device includes a display substrate 100, an opposite substrate 200 and a liquid crystal layer 300.

The display substrate 100 includes a first base substrate 110 having a transmissive area TA and a reflective area RA. A gate line GL, a first data line DL1, a second data line DL2, a storage line STL, a first switching element TR1, a second switching element TR2, a first pixel electrode PE1, a second pixel electrode PE2 and a first alignment layer 190 are formed on the first base substrate 110.

The gate line GL is extended along a first direction, and the first and second data lines DL1 and DL2 are extended along a second direction crossing the first direction. The first and second data lines DL1 and DL2 are adjacent to each other. The storage line STL is extended along the first direction and is adjacent to the gate line GL.

The first switching element TR1 is adjacent to a crossing portion of the gate line GL and the first data line DL1. The first switching element TR1 includes a first gate electrode GE1 connected to the gate line GL, a first source electrode SE1 connected to the first data line DL1, and a first drain electrode DE1 electrically connected to the first pixel electrode PE1 through a first contact portion CT1.

The second switching element TR2 is adjacent to a crossing portion of the gate line GL and the second data line DL2. The second switching element TR2 includes a second gate electrode GE2 connected to the gate line GL, a second source electrode SE2 connected to the second data line DL2, and a second drain electrode DE2 electrically connected to the second pixel electrode PE2 through a second contact portion CT2. The first and second switching elements TR1 and TR2 further include a first channel pattern CH1 and a second channel pattern CH2.

The first pixel electrode PE1 and a second pixel electrode PE2 respectively receive different voltages. The first pixel electrode PE1 includes a first transmissive electrode TE1 and a first reflective electrode RE1 which are patterned on the first base substrate 110, and the second pixel electrode PE2 includes a second transmissive electrode TE2 and a second reflective electrode RE2 which are patterned on the first base substrate 110. Here, the first and second transmissive electrodes TE1 and TE2 adjacent to each other are formed in correspondence with the transmissive area TA, and the first and second reflective electrodes RE1 and RE2 adjacent to each other are formed in correspondence with the reflective area RA.

A data voltage of a first polarity delivered to the first data line DL1 through the first switching element TR1 is applied to the first pixel electrode PE1, so that the first pixel electrode PE1 has the first polarity (e.g., +). A data voltage of a second polarity delivered to the second data line DL2 through the second switching element TR2 is applied to the second pixel electrode PE2, so that the second pixel electrode PE2 has the second polarity (e.g., −).

For example, the first and second pixel electrodes PE1 and PE2 are formed on an identical layer, and a horizontal electrical field is formed between the first pixel electrode PE1 and the second pixel PE2 due to voltages respectively provided to the first pixel electrode PE1 and the second pixel PE2.

The first alignment layer 190 is formed on the first and second pixel electrodes PE1 and PE2, which are formed on the first base substrate 110.

The display substrate 100 may further include a gate insulation layer 120, a protective insulation layer 150, a reflective layer 160, a color filter layer 170 and an organic insulation layer 172.

The color filter layer 170 is formed on the protective insulation layer 150 in correspondence with the transmissive area TA and the reflective area RA. The color filter layer 170 may be formed in a flat shape. The thickness of the color filter layer 170 corresponding to the transmissive area TA may be substantially equal to that of the color filter layer 170 corresponding to the reflective area RA. The color filter layer 170 may include, for example, a red color filter, a green color filter or a blue color filter.

The organic insulation layer 172 is formed on the color filter layer 170 corresponding to the transmissive area TA. The insulation layer 170 may include an embossed pattern.

The reflective layer 160 is formed between the protective insulation layer 150 and the color filter layer 170. A black matrix BM may be further formed on the protective insulation layer 150 corresponding to an area where the gate line GL, the first and second data lines DL1 and DL2, the first and second switching elements TR1 and TR2 are formed.

The opposite substrate 200 includes a second base substrate 210. A second alignment layer 220 is formed on the second base substrate 210.

The liquid crystal layer 300 includes a liquid crystal medium having a changeable optical anisotropy according to the electric field formed between the first pixel electrode PE1 and the second pixel electrode PE2. Additionally, the LCD device may further include a column spacer CS disposed between the display substrate 100 and the opposite substrate 200, a first polarizing plate 510, a first ¼λ plate 420, and a second polarizing plate 520.

A cell gap of the liquid crystal layer 300 in the transmissive area TA including the first transmissive electrode TE1 and the second transmissive electrode TE2 may be substantially equal to a cell gap in the reflective area RA including the first reflective electrode RE1 and the second reflective electrode RE2. Thus, the thickness of the liquid crystal layer 300 is substantially regular, and the cell gaps in the transmissive area TA and in the reflective area RA may be substantially equal. Therefore, a mono-cell gap may be used in the transflective-type LCD device.

Here, the transmission length of a first light through the liquid crystal layer 300 in correspondence with the transmissive area TA is different from the transmission length of a second light through the liquid crystal layer 300 in correspondence with the reflective area RA.

To increase uniformity of the driving of the liquid crystal layer 300 in the transmissive area TA and the reflective area RA, the retardation of the liquid crystal layer 300 corresponding to the first light may be substantially half that of the retardation of the liquid crystal layer 300 corresponding to the second light.

According to an embodiment of the present invention, a magnitude of the electric field of the liquid crystal layer 300 corresponding to the transmissive area TA may be about twice that of the magnitude of the electric field of the liquid crystal layer 300 corresponding to the reflective area RA. The different magnitudes may be achieved by forming the first and second transmissive electrodes TE1 and TE2 having embossed patterns, and the first and second reflective electrodes RE1 and RE2 having bar shapes.

Figure 3:
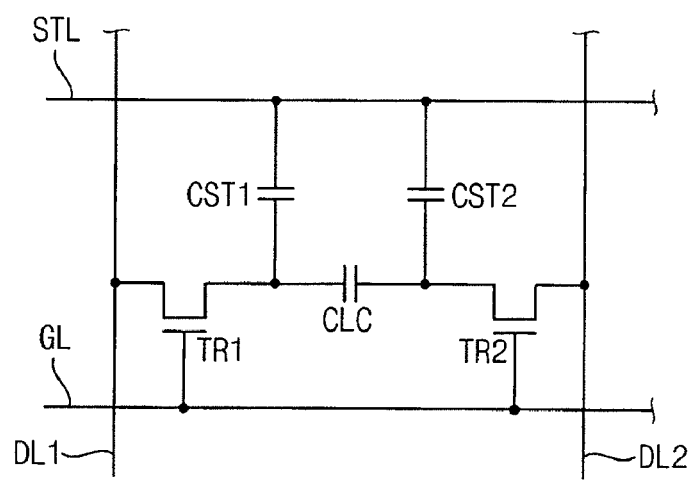
FIG. 3 is an equivalent circuit diagram illustrating the LCD device in FIG. 1.

FIG. 3 is an equivalent circuit diagram illustrating the LCD device in FIG. 1.

Referring to FIGS. 1 and 3, a unit pixel is driven by data signals that are delivered through two data lines DL1 and DL2 and a gate signal that is delivered through a gate line GL. For example, the unit pixel includes the first switching element TR1, the second switching element TR2, a liquid crystal capacitor CLC, a first storage capacitor CST1 and a second storage capacitor CST2. The first switching element TR1 includes a control electrode (hereinafter, a gate electrode) that is connected to the gate line GL, an input electrode (hereinafter, a source electrode) that is connected to the first data line DL1, and an output electrode (hereinafter, a drain electrode) that is connected to a first terminal of the liquid crystal capacitor CLC. The second switching element TR2 includes a gate electrode that is connected to the gate line GL, and a source electrode that is connected to the second data line DL2, and a drain electrode that is connected to a second terminal of the liquid crystal capacitor CLC.

Data signals having dual polarities are applied to the first and second data lines DL1 and DL2, respectively. For example, a positive polarity data signal with respect to a reference voltage is applied to the first data line DL1, and a negative polarity data signal with respect to the reference voltage is applied to the second data line DL2. Thus, positive and negative polarity voltages are applied so that the liquid crystal capacitor CLC may be driven by a high voltage. Accordingly, the dual polarity driving method may enhance the response time and the light transmittance of an LCD device.

Figure 4:
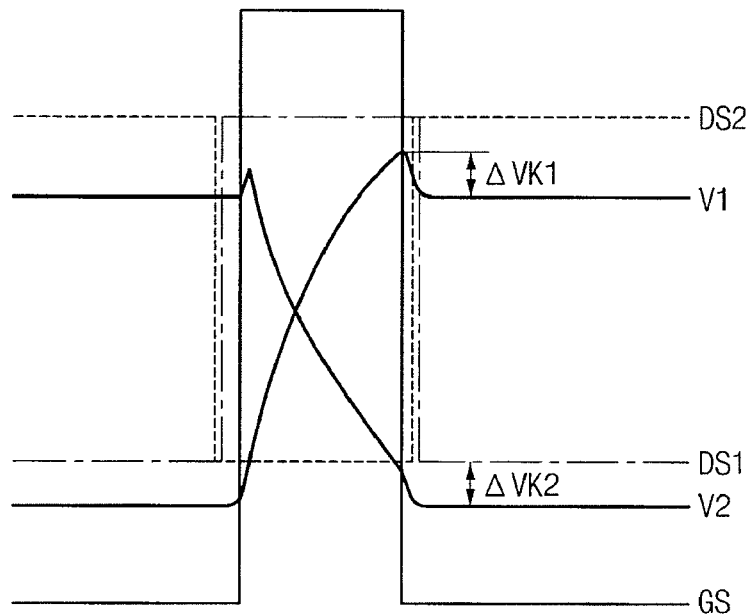
FIG. 4 is a waveform diagram illustrating a variation of voltages at the first and second pixel electrodes of FIG. 3.

FIG. 4 is a waveform diagram illustrating a variation of voltages at the first and second pixel electrodes of FIG. 3. In FIG. 4, a voltage provided to the first pixel electrode PE1 is defined as a first pixel voltage V1, a voltage provided to the second pixel electrode PE2 is defined as a first pixel voltage V2, and a signal provided to the first data line DL1 is defined as a first data signal DS1. Additionally, a signal provided to the second data line DL2 is defined as a second data signal DS2, and a signal provided to the gate line GL is defined as a gate signal GS.

Referring to FIG. 4, the first pixel voltage V1 gradually rises to the positive polarity voltage of the first data signal DS1 and the second pixel voltage V2 gradually falls to the negative polarity voltage of the second data signal DS2 when the gate signal GS is provided to the gate line GL. A first kickback voltage ΔVK1 and a second kickback voltage ΔVK2 are generated when the gate signal is turned on. The first kickback voltage ΔVK1 and a second kickback voltage ΔVK2 respectively reduce the first pixel voltage V1 and second pixel voltage V2. The first kickback voltage ΔVK1 and the second kickback voltage ΔVK2 are substantially equal to each other. Therefore, a flicker phenomenon may be substantially prevented by removing a difference the first and second kickback voltages ΔVK1 and ΔVK2.

Figure 5A:
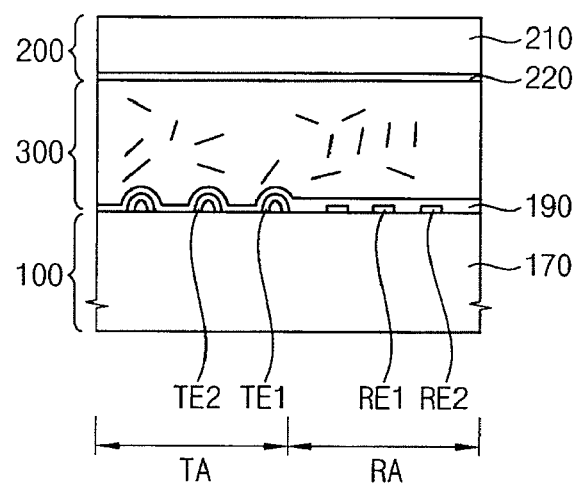
FIGS. 5A to 5C are cross-sectional views illustrating states of a liquid crystal medium in the liquid crystal layers of FIG. 2.
Figure 5B:
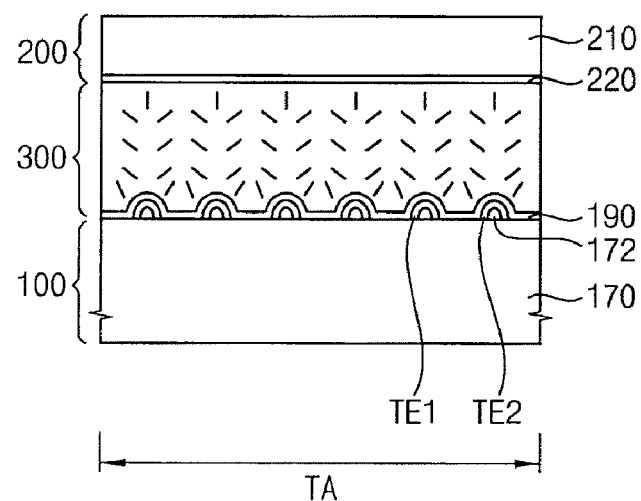
Figure 5C:
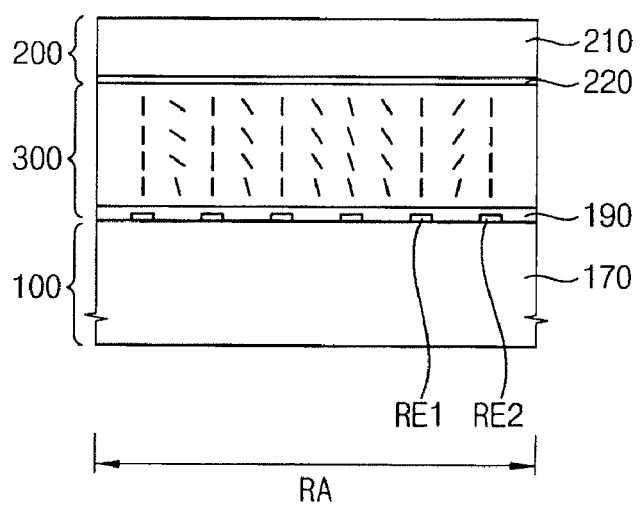

FIGS. 5A to 5C are cross-sectional views illustrating states of a liquid crystal medium in the liquid crystal layer 300 of FIG. 2.

Referring to FIGS. 2, 5A to 5C, the liquid crystal medium of the liquid crystal layer 300 is changed according to the electric fields formed between the first transmissive electrodes TE1 and the second transmissive electrodes TE2, and the first reflective electrodes RE1 and the second reflective electrodes RE2.

Referring to FIG. 5A, the liquid crystal medium is in an optical isotropic state when an electric field is not applied to the liquid crystal medium, the liquid crystal medium has an orderly structure representing cubic symmetry, and the LCD device represents a dark state. The liquid crystal medium is in an optical anisotropic state when an electric field is applied to the liquid crystal medium, and the LCD device represents a white state.

The liquid crystal medium is in the optical isotropic state when an electric field is not applied to the liquid crystal medium and in the optical anisotropic state when an electric field is applied to the liquid crystal medium. Therefore, light leakage may be substantially prevented. Additionally, the liquid crystal molecules are individually changed, and thus the light viscosity of the liquid crystal medium may not affect the response time of the LCD device. Thus, the LCD device may have a rapid response time.

Additionally, the polymer-stabilized liquid crystal is in a stable state due to an ultraviolet (UV) hardening process. According to an exemplary embodiment of the present invention, a color filter on array (COA) may be implemented.

Referring to FIGS. 5B and 5C, the magnitude of the electric field between the first and second transmissive electrodes TE1 and TE2 is about twice that of the magnitude of the electric field between the first and second reflective electrodes RE1 and RE2. because the difference in the magnitudes of the electric fields can be achieved through different structures, for example, the first and second transmissive electrodes TE1 and TE2 have embossed patterns and the first and second reflective electrodes RE1 and RE2 have bar shapes. Thus, the liquid crystal of FIG. 5B is more horizontal than the liquid crystal of FIG. 5C. The light leakage from the reflective area RA may be reduced by not using the embossed pattern.

Therefore, the magnitude of the electric field of the liquid crystal layer 300 corresponding to the transmissive area TA may be about twice that of the magnitude of the electric field of the liquid crystal layer 300 corresponding to the reflective area RA. Thus, a mono-cell gap may be used instead of a multi-cell gap.

Figure 6A:
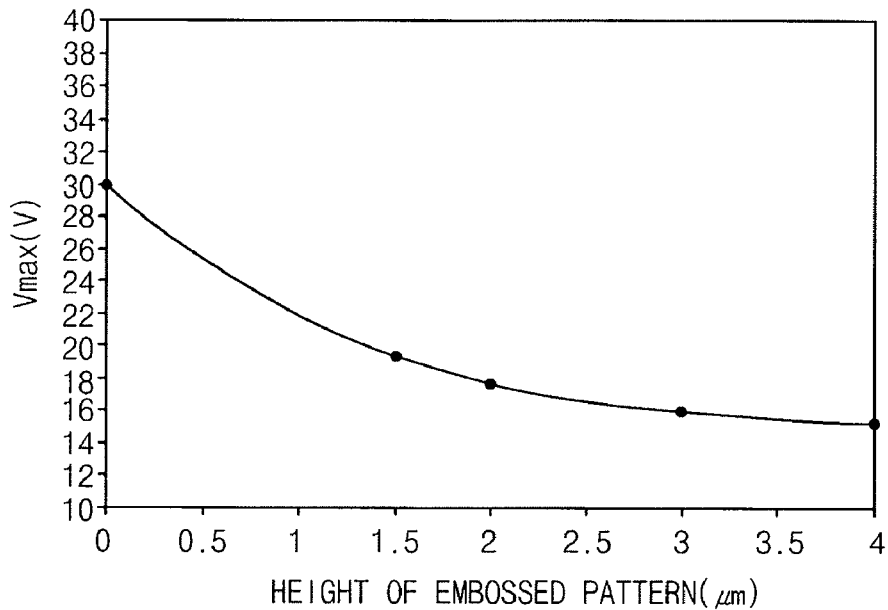
FIG. 6A is a graph illustrating a driving voltage of liquid crystal molecules according to a height of the embossed pattern of the insulation layer described in FIG. 2.

FIG. 6A is a graph illustrating a driving voltage of liquid crystal molecules according to a height of the embossed pattern of the insulation layer described in FIG. 2.

In FIG. 6A, a x-axis represents the height of the embossed pattern included on the insulation layer 120, and a y-axis represents voltages incident to the first and second reflective electrodes RE1 and RE2, and the first and second transmissive electrodes TE1 and TE2. Here, the height of the embossed pattern included on transmissive electrode TE1 and TE2 may be about 1 μm to about 4 μm.

Referring to FIG. 6A, the driving voltage of the reflective area RA is about 30 V when the insulation layer does not include the embossed pattern. The driving voltages of the reflective area RA are respectively about 22 V, about 18 V and about 16 V when the insulation layer respectively includes the embossed patterns having heights of 1 μm, 2 μm and 4 μm.

As the height of the embossed pattern of the insulation layer increases, a maximum voltage Vmax of the driving voltage decreases.

As illustrated above, the maximum voltage Vmax of the driving voltage that is needed when the insulation layer does not include the embossed pattern is about twice that of the maximum voltage Vmax of the driving voltage that is needed when the insulation layer includes the embossed pattern of a height of about 4 μm. Thus, the magnitude of the electric field of the liquid crystal layer 300 corresponding to the transmissive area TA may be about twice that of the magnitude of the electric field of the liquid crystal layer 300 corresponding to the reflective area RA by controlling the height of the embossed pattern, to reduce the driving voltage needed.

Figure 6B:
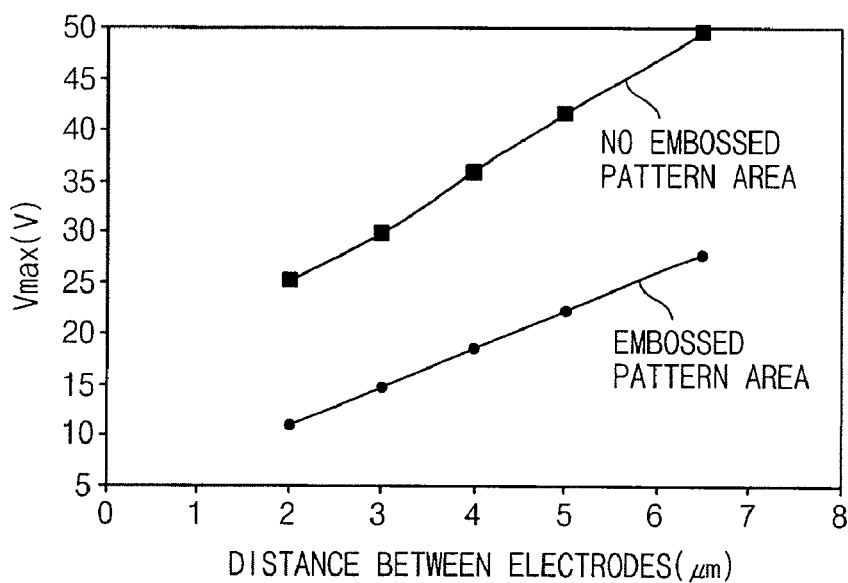
FIG. 6B is a graph illustrating a driving voltage of liquid crystal molecules according to a distance between the transmissive electrodes, and a driving voltage of liquid crystal molecules according to a distance between the reflective electrodes.

FIG. 6B is a graph illustrating a driving voltage of liquid crystal molecules according to a distance between the first and second transmissive electrodes TE1 and TE2, and a driving voltage of the liquid crystal layer according to a distance between the first and second reflective electrodes RE1 and RE2.

In FIG. 6B, a x-axis represents the distance between the first and second transmissive electrodes TE1 and TE2, and the distance between the first and second reflective electrodes RE1 and RE2. Additionally, a y-axis represents the driving voltage provided to the first and second transmissive electrodes TE1 and TE2, and the driving voltage provided to the first and second reflective electrodes RE1 and RE2. Here, the first and second transmissive electrodes TE1 and TE2 have the embossed patterns formed thereon, and the first and second reflective electrodes RE1 and RE2 have the bar shapes. Here, the width of each of the first and second transmissive electrodes TE1 and TE2 may be about 2 μm through 5 μm, the distance between the first and second transmissive electrodes TE1 and TE2 may be about 2 μm to about 10 μm. Additionally, the width of each of the first and second reflective electrodes RE1 and RE2 may be about 2 μm to about 5 μm, the distance between the first and second reflective electrodes RE1 and RE2 may be about 2 μm to about 10 μm.

Referring to FIG. 6B, as the distance between the electrodes increases, the maximum voltage Vmax of the driving voltage increases. Therefore, the maximum voltage Vmax of the driving voltage may be reduced by reducing the distance between the electrodes.

Additionally, referring to the voltage-distance graph for the first and second electrodes RE1 and RE2 in a non-embossed pattern area which is indicated by square dots, and referring to the voltage-distance graph for the first and second electrodes TE1 and TE2 in an embossed pattern area which is indicated by circular dots, the driving voltage corresponding to the first and second electrodes RE1 and RE2 is about twice that of the driving voltage corresponding to the first and second electrodes TE1 and TE2. Here, the voltage-distance graph for the first and second electrodes RE1 and RE2 and the voltage-distance graph for the first and second electrodes TE1 and TE2 are substantially linear. Therefore, the maximum voltage Vmax of the driving voltage needed in the embossed pattern area TA may be about half that of the maximum voltage Vmax of the driving voltage needed in the non-embossed area RA by the first and second electrodes TE1 and TE2 having the embossed patterns and the first and second electrodes RE1 and RE2 having the bar shapes.

Figure 6C:
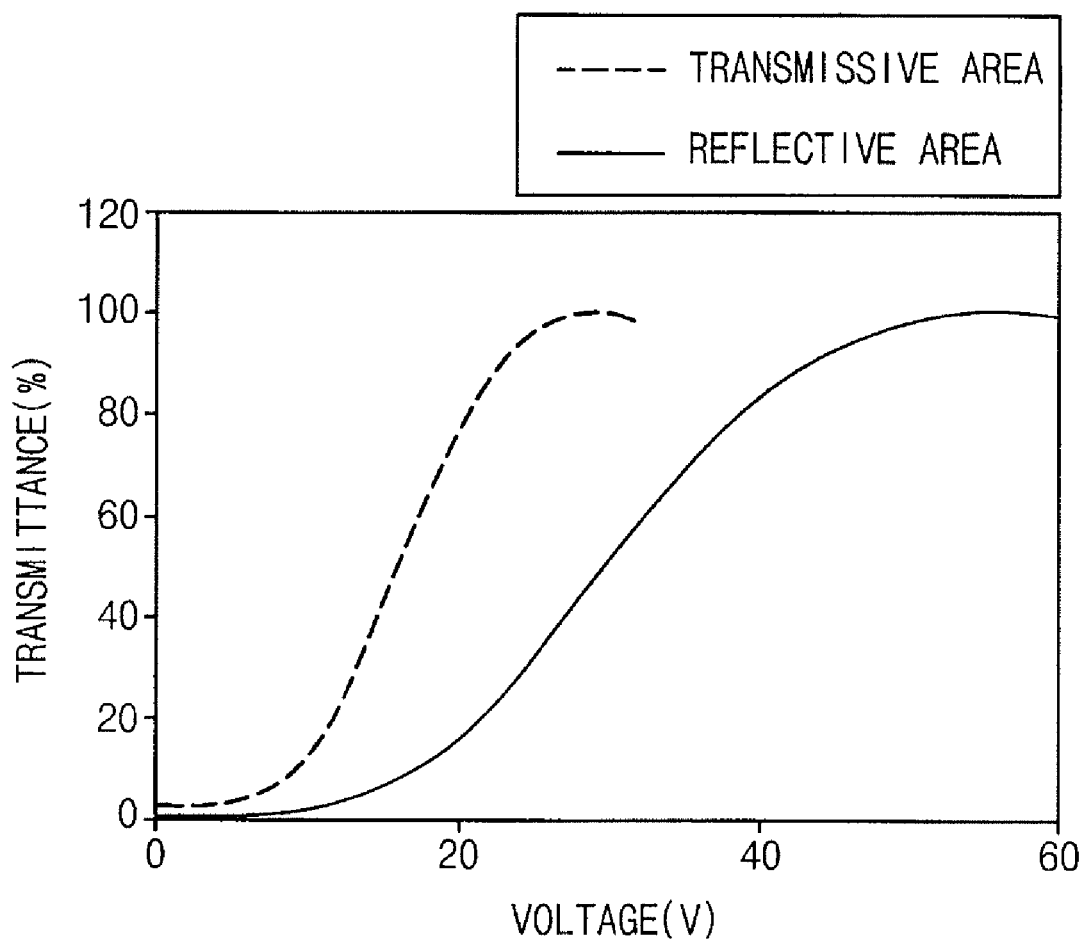
FIG. 6C is a graph illustrating a relationship between the driving voltages applied to the transmissive electrodes and the reflective electrodes and transmittances for each of the transmissive area and the reflective area.

FIG. 6C is a graph illustrating a relationship between the driving voltages applied to the transmissive electrodes and the reflective electrodes and transmittances for each of the transmissive area TA and the reflective area RA.

In FIG. 6C, a x-axis represents the driving voltages provided to the first and second reflective electrodes RE1 and RE2 and the first and second transmissive electrodes TE1 and TE2, and a y-axis represents the transmittances of the liquid crystal layer 300 corresponding to the first and second reflective electrodes RE1 and RE2 and the first and second transmissive electrodes TE1 and TE2, using a percent unit. Here, the first and second transmissive electrodes TE1 and TE2 have the embossed patterns and the first and second reflective electrodes RE1 and RE2 have the bar shapes.

Referring to FIG. 6C, in the transmissive area TA, the transmittance represented by dotted line remains almost 0 V, the transmittance gradually rises at a the driving voltage of about 10 V, and the transmittance is almost 100% when the driving voltage is about 20 V. However, in the reflective area RA, the transmittance represented by a solid line remains almost 0 V, the transmittance gradually rises at a driving voltage of about 10 V, and the transmittance is almost 100% when the driving voltage is about 40 V. Therefore, the transmittance of the liquid crystal layer 300 transmitting the first light corresponding to the first and second transmissive electrodes TE1 and TE2 is about twice that of the transmittance of the liquid crystal layer 300 transmitting the second light corresponding to the first and second reflective electrodes RE1 and RE2. The second light is reflected by the reflective layer 160 after passes the first and second reflective electrodes RE1 and RE2. Therefore, the retardation the liquid crystal layer 300 corresponding to the transmissive area TA is reduced to about half that of the retardation the liquid crystal layer 300 corresponding to the reflective area RA.

Accordingly, different retardations of the liquid crystal layer 300 may be controlled by the embossed pattern of the first and second transmissive electrodes TE1 and TE2 with one driving voltage. Therefore, the mono-cell gap may be used in the transflective-type LCD device instead of the multi-cell gap which is used for controlling different retardations.

Figure 7A:
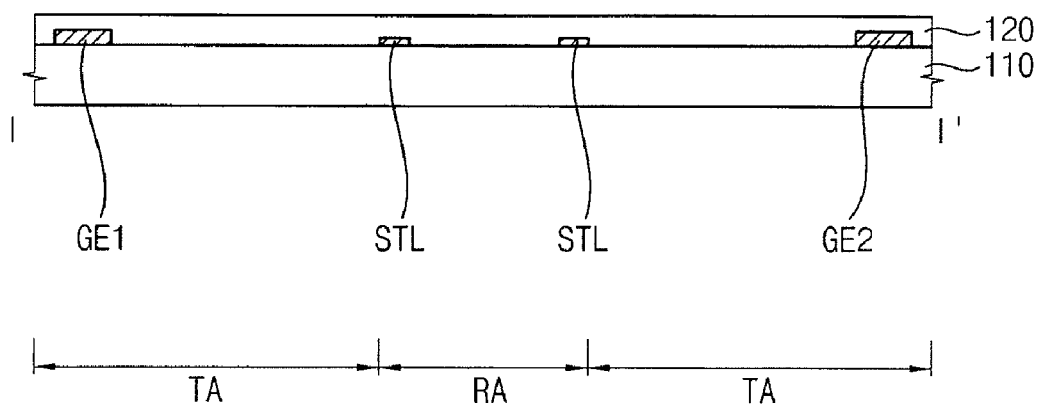
FIGS. 7A to 7C are cross-sectional views illustrating a method of manufacturing the display substrate of the LCD device in FIG. 2.
Figure 7B:
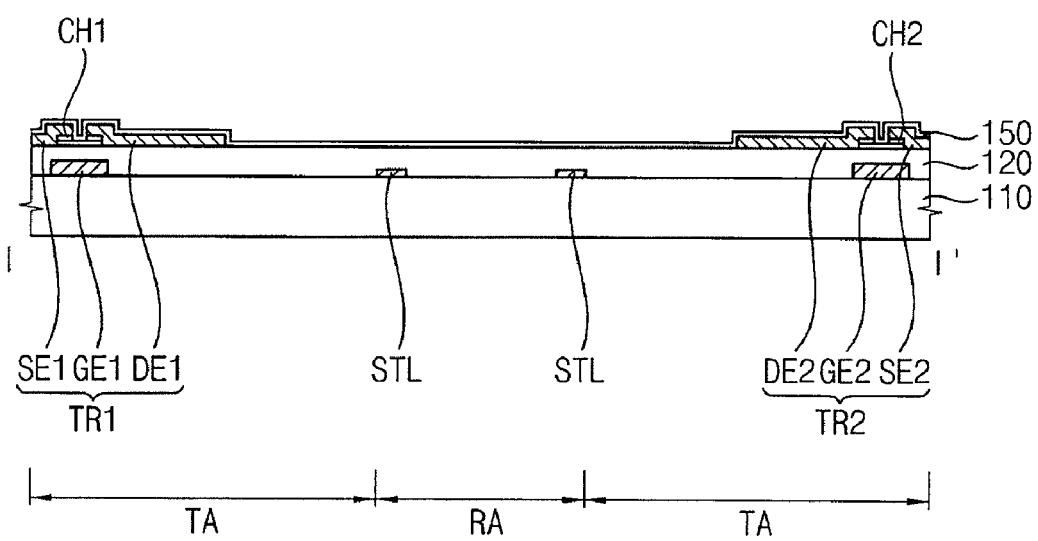
Figure 7C:
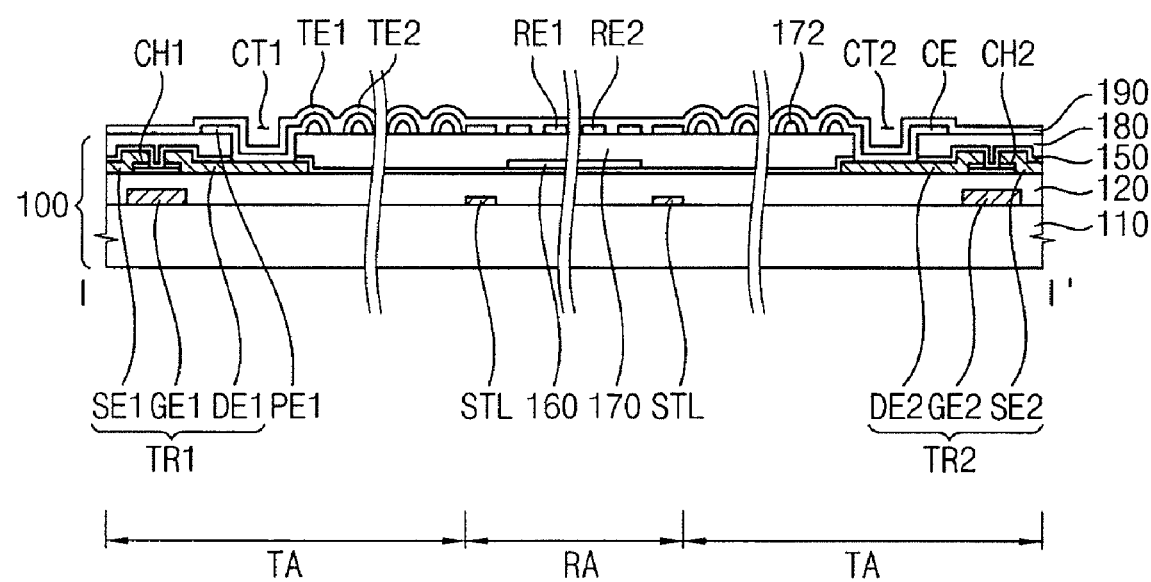

FIGS. 7A to 7C are cross-sectional views illustrating a method of manufacturing the display substrate 100 of the LCD device in FIG. 2.

Referring to FIGS. 2 and 7A, the first base substrate 110 including the transmissive area TA and the reflective area RA is provided. A gate metal is formed on the first base substrate 110. A gate metal pattern including the gate line GL, the first and second gate electrodes GE1 and GE2 and the storage line STL is patterned from the gate metal.

The gate insulation layer 120 is formed on the gate metal pattern which is formed on the first base substrate 110.

Referring to FIGS. 2 and 7B, the first and second channel patterns CH1 and CH2 are formed on the gate insulation layer 120 which is formed on the first base substrate 110. A source metal is formed on the first and second channel patterns CH1 and CH2 which is formed on the gate insulation layer 120. A source metal pattern including the first and second data lines DL1 and DL2, the first and second source electrodes SE1 and SE2 and the first and second drain electrodes DE1 and DE2 is patterned from the source metal. Here, the first and second channel patterns CH1 and CH2 and the source metal pattern are formed by using different masks. However, the first and second channel patterns CH1 and CH2 and the source metal pattern may be formed by using the same mask. The protective insulation layer 150 is formed on the source metal pattern above the first base substrate 110.

Referring to FIGS. 2 and 7C, the black matrix BM, the reflective layer 160, the color filter layer 170 and the organic insulation layer 172 are formed on the protective insulation layer 150 above the first base substrate 110. Here, the black matrix BM is formed on the protective insulation layer 150 corresponding to the gate line GL, the first and second data lines DL1 and DL2, and the first and second switching elements TR1 and TR2.

The reflective layer 160 is formed between the protective insulation layer 150 and the color filter layer 170.

The color filter layer 170 is formed with substantially the same thickness on the protective insulation layer 150 corresponding to the transmissive area TA and the reflective area RA. Here, the color filter layer 170 may include a red color filter, a green color filter and/or a blue color filter.

The organic insulation layer 172 is formed on the color filter layer 170 corresponding to the transmissive area TA. Here, the organic insulation layer 172 has sub-isolation members.

The first and second channel patterns CH1 and CH2 are formed by etching the black matrix BM and the protective insulation layer 150 to expose the first and second drain electrodes DE1 and DE2. Transparent conductive layer is formed and the first and second pixel electrodes PE1 and PE2 are patterned from the transparent conductive layer. The first and second pixel electrodes PE1 and PE2 are electrically connected to the first and second drain electrodes DE1 and DE2 through the first and second channel patterns CH1 and CH2. The first pixel electrode PE1 includes the first transmissive electrodes TE1 and the first reflective electrodes RE1, and the second pixel electrode PE2 includes the second transmissive electrodes TE2 and the second reflective electrodes RE2. Here, the first and second transmissive electrodes TE1 and TE2 have the embossed patterns, and the first and second reflective electrodes RE1 and RE2 have bar shapes.

The first alignment layer 190 is formed on the first and second pixel electrodes PE1 and PE2 above the first base substrate 110.

Figure 8A:
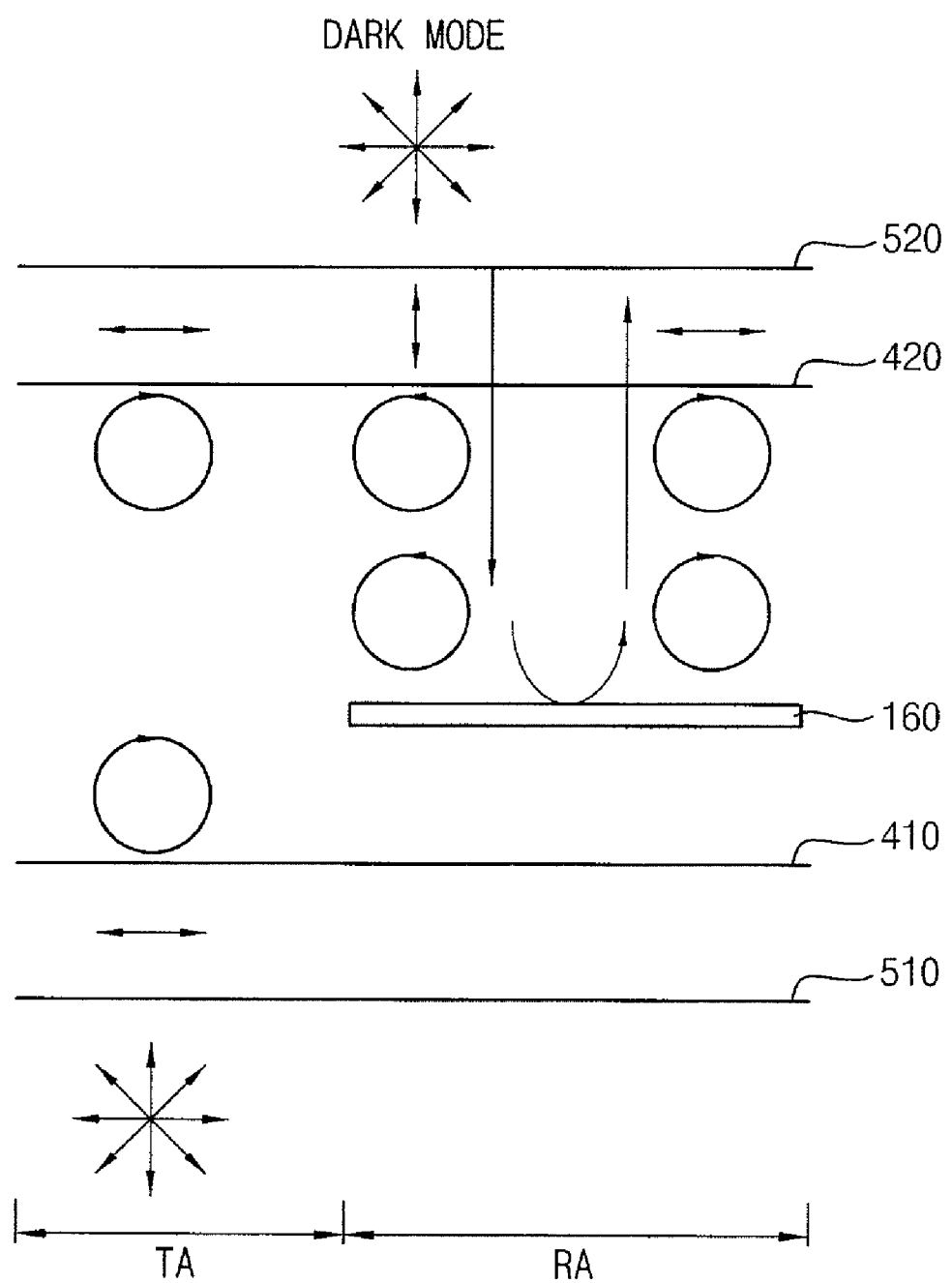
FIGS. 8A and 8B are schematic diagrams illustrating a polarizing state of light when the LCD device is driven in accordance with the method described in FIGS. 4 to 6C.
Figure 8B:
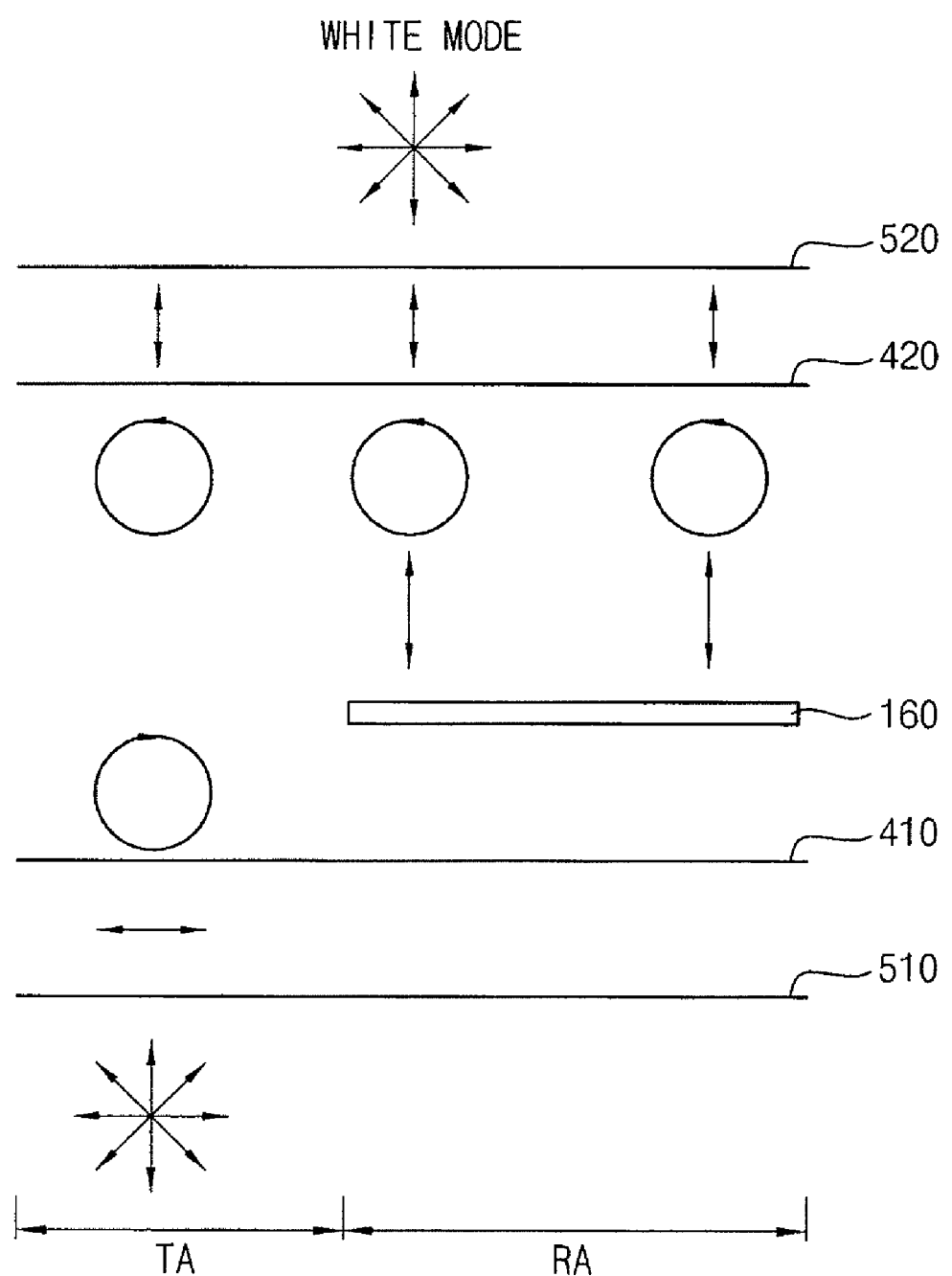

FIGS. 8A and 8B are schematic diagrams illustrating a polarizing state of light when the LCD device is driven in accordance with the method described in FIGS. 4 to 6C. Here, the first and second ¼λ plates 410 and 420 are used so that a dark mode and a white mode on both the transmissive area TA and the reflective area RA are displayed.

The dark mode is illustrated in FIG. 8A as an off state when the first pixel voltage V1 is not applied to the first transmissive electrodes TE1 and the first reflective electrodes RE1, and the second pixel voltage V2 is not applied to the second transmissive electrode TE2 and the second reflective electrode RE2. The white mode is illustrated in FIG. 8B as an on state when the first pixel voltage V1 is applied to the first transmissive electrodes TE1 and the first reflective electrodes RE1, and the second pixel voltage V2 is applied to the second transmissive electrode TE2 and the second reflective electrode RE2.

Referring to FIGS. 2, 4, 8A, and 8B, the first ¼λ plate 410 is disposed on a rear face of the display substrate 110. The first polarizing plate 510 is disposed under the first ¼λ plate 410. The second ¼λ plate 420 is disposed on an upper face of the opposite substrate 210. The second polarizing plate 520 is disposed on the second ¼λ plate 420.

The first light being incident into the first polarizing plate 510 in FIG. 8A is linearly polarized by the first polarizing plate 510. Then the first light is circularly polarized along a first polarization direction by the first ¼λ plate 410 and is incident into the liquid crystal layer 300 through the first and second transmissive electrodes TE1 and TE2. The first polarization direction is used for convenience so as to discriminate a circular polarization direction.

The liquid crystal layer 300 maintains the polarization direction of the first light in the off state. Thus, the first light which is circularly polarized along the first polarization direction may be linearly polarized by the second ¼λ plate 420. The first light is blocked by the second polarizing plate 520 whose polarizing axis is perpendicular to that of the first polarizing plate 510 so that the dark mode may be displayed.

The second light being incident into the second polarizing plate 520 is linearly polarized by the second polarizing plate 520. Then the second light is circularly polarized along a second polarization direction by the second ¼λ plate 420 and is incident into the liquid crystal layer 300 through the first and second reflective electrodes RE1 and RE2. The second polarization direction is referred to as a direction having a 180-degree phase difference with respect to the first polarization direction.

The polarization direction of the second light passing through the liquid crystal layer 300 may not vary in the off state. When the second light is reflected from the reflective layer 160 after the second light is transmitted through the first and second reflective electrodes RE1 and RE2, the phase of the second light is inverted to the second polarization direction. Thus, the second light after reflection may be circularly polarized light along the first polarization direction and is again incident into the second ¼λ plate 420.

The second light which is circularly polarized light along the first polarization direction is linearly polarized by the second ¼λ plate 420. The second light is blocked by the second polarizing plate 520 so that the dark mode may be displayed.

Thus, the dark mode is displayed in the transmissive area TA and the reflective area RA in the off state.

Referring to FIG. 8B, the cell gap is constant in the transmissive area TA and the reflective area RA. The liquid crystal layer 300 may alter the polarization direction of incident light.

The liquid crystal layer 300 corresponding to the transmissive area TA is realigned due to electric field generated by the first transmissive electrode TE1 to which the first pixel voltage V1 is applied and the second transmissive electrode TE2 to which the second pixel voltage V2 is applied. Thus, the first light passing through the liquid crystal layer 300 may experience a ½λ phase difference.

Thus, the first light which is circularly polarized along the first polarization direction is circularly polarized along the second polarization direction by the liquid crystal layer 300. The first light which is circularly polarized along the second polarization direction may be linearly polarized by the second ¼λ plate 420. The first light passes through the second polarizing plate 520 so that the white mode may be displayed.

The liquid crystal layer 300 corresponding to the reflective area RA is realigned due to an electric field generated by the first reflective electrode RE1 to which the first pixel voltage V1 is applied and the second reflective electrode RE2 to which the second pixel voltage V2 is applied. Thus, the second light passing through once the liquid crystal layer 300 in the reflective area RA may experience a ¼λ phase difference.

Thus, the second light which is circularly polarized along the second polarization direction by the second ¼λ plate 420 is linearly polarized by the liquid crystal layer 300 and is incident into the first and second reflective electrodes RE1 and RE2. The second light has a phase inversion before and after reflection on the reflective layer 160 after passing the first and second reflective electrodes RE1 and RE2. Then, the second light, linearly polarized light, is passed through the liquid crystal layer 300 again. The phase of the second light is altered by ¼λ due to the liquid crystal layer 300 so that the second light is circularly polarized along the second direction.

The second light may be linearly polarized by the second ¼λ plate 420. The second light passes through the second polarizing plate 520 so that the white mode may be displayed.

Thus, the white mode is displayed in the transmissive area TA and the reflective area RA in the on state.

Thus, light efficiency in the transmissive area TA and the reflective area RA may be improved. Additionally, outdoor visibility of the LCD device may be high due to a transflective method. Therefore, the outdoor visibility may be enhanced when the area of the reflective area RA rises.

Figure 9:
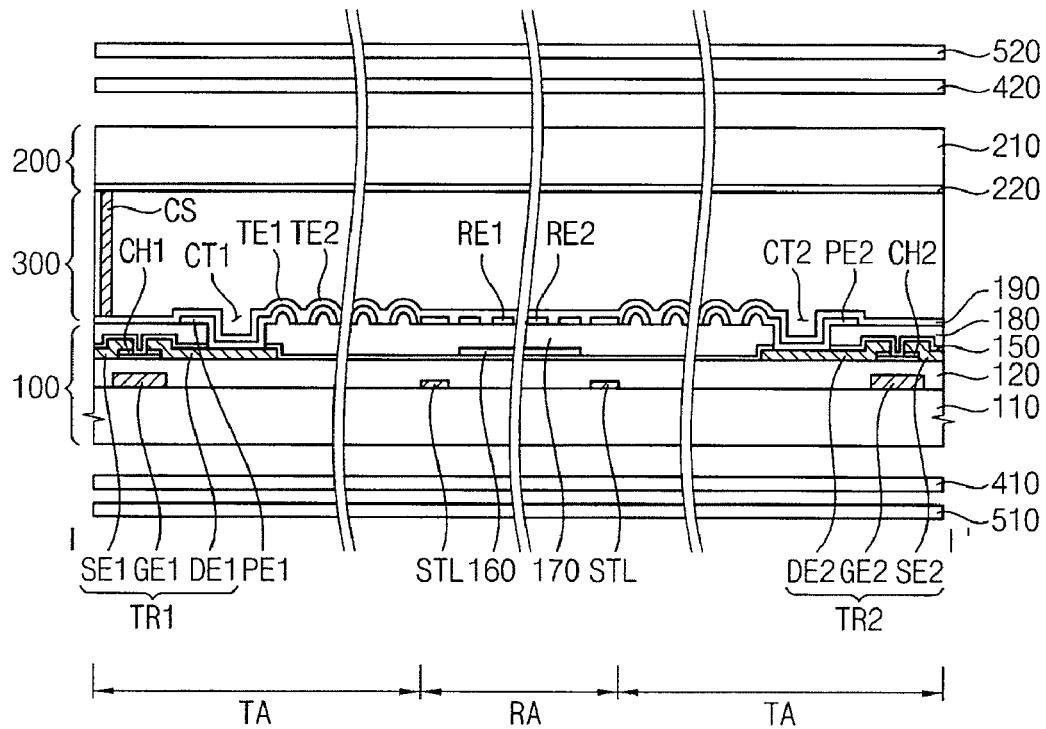
FIG. 9 is a plan view illustrating an LCD device according to an exemplary embodiment of the present invention.

FIG. 9 is a plan view illustrating an LCD device according to an exemplary embodiment of the present invention.

The LCD device in FIG. 9 is substantially the same as the LCD device in FIG. 1 except that a color filter layer 270 corresponding to the transmissive area TA has embossed patterns, and the color filter layer 270 corresponding to the reflective area RA is flat. Thus, a corresponding reference numbers are used for corresponding elements and repetitive descriptions are omitted.

The color filter layer 270 corresponding to the transmissive area TA has embossed patterns. The color filter layer 270 is formed with substantially the same thickness in the transmissive area TA and the reflective area RA. The size of embossed pattern illustrated in FIG. 9 is exaggerated, and thus the thickness of the color filter layer 270 corresponding to the transmissive area TA and the thickness of the color filter layer 270 corresponding to the reflective area RA are substantially equal to each other.

A driving method of the LCD device in FIG. 9 is substantially equal to the driving method illustrated in FIGS. 4 to 6C. Thus, repetitive descriptions are omitted.

Figure 10A:
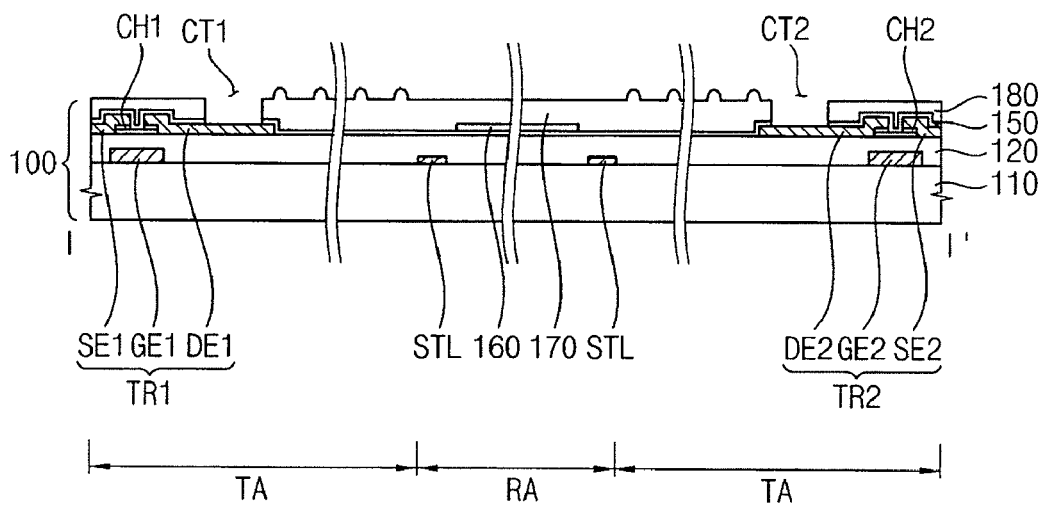
FIGS. 10A and 10B are cross-sectional views illustrating a method of manufacturing a display substrate of an LCD device according to FIG. 9.
Figure 10B:
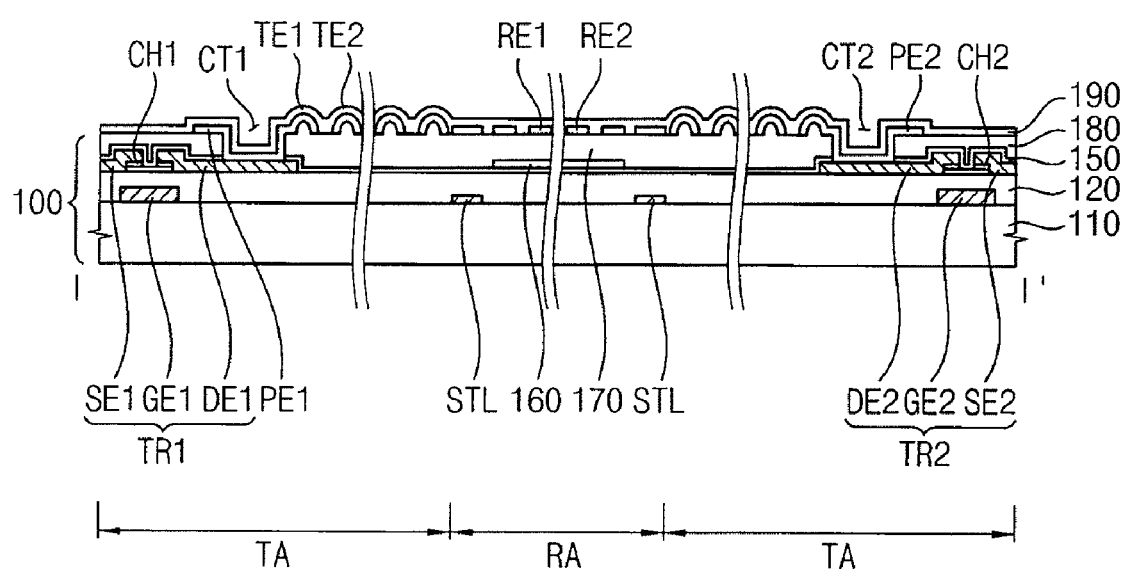

FIGS. 10A and 10B are cross-sectional views illustrating a method of manufacturing a display substrate 200 of an LCD device according to an exemplary embodiment of the present invention. However, the method of manufacturing the display substrate 200 until the protective insulation layer 150 is formed is substantially the same as to the method of manufacturing the display substrate 100. Thus, repetitive descriptions are omitted.

Referring to FIGS. 9 and 10A, the black matrix BM, the reflective layer 160 and the color filter layer 270 are formed on the protective insulation layer 150 above the first base substrate 110. Here, the black matrix BM is formed on the protective insulation layer 150 corresponding to the gate line GL, the first and second data lines DL1 and DL2, and the first and second switching elements TR1 and TR2.

The reflective layer 160 is formed corresponding to the reflective area RA between the protective insulation layer 150 and the color filter layer 170.

The color filter layer 270 is formed with substantially the same thickness on the protective insulation layer 150 corresponding to the transmissive area TA and the reflective area RA. Here, the color filter layer 270 may include a red color filter, a green color filter and/or a blue color filter.

The color filter layer 270 is formed corresponding to the transmissive area TA with embossed patterns. Here, the embossed patterns are extended from the color filter layer 270. Thus, a manufacturing process for patterning of an insulation layer may be omitted. Therefore, costs of the manufacturing process may be reduced and productivity may be enhanced.

The first and second channel patterns CH1 and CH2 are formed by etching the black matrix BM and the protective insulation layer 150 to expose the first and second drain electrodes DE1 and DE2.

Referring to FIGS. 9 and 10B, transparent conductive layer is formed on the first and second channel patterns CH1 and CH2. The first and second pixel electrodes PE1 and PE2 are patterned from the transparent conductive layer. The first and second pixel electrodes PE1 and PE2 are electrically connected to the first and second drain electrodes DE1 and DE2 through the first and second channel patterns CH1 and CH2. The first pixel electrode PE1 includes the first transmissive electrodes TE1 and the first reflective electrodes RE1, and the second pixel electrode PE2 includes the second transmissive electrodes TE2 and the second reflective electrodes RE2. Here, the first and second transmissive electrodes TE1 and TE2 have the embossed pattern, and the first and second reflective electrodes RE1 and RE2 have bar shapes.

The first alignment layer 190 is formed on the first and second pixel electrodes PE1 and PE2 above the first base substrate 110.

Accordingly, the magnitude of the electric field of the liquid crystal layer 300 corresponding to the transmissive area TA may be about twice that of the magnitude of the electric field of the liquid crystal layer 300 corresponding to the reflective area RA. Thus, a mono-cell gap may be used instead of a multi-cell gap.

Polarization, on the transmissive electrodes and reflective electrodes when the LCD device is driven according to the method illustrated in FIGS. 4 to 6C, is substantially the same as the polarization on the transmissive electrodes and reflective electrodes illustrated in FIGS. 8A and 8B. Thus, repetitive descriptions are omitted.

According to the embodiments of the present invention, different retardations of a liquid crystal layer may be controlled by an embossed pattern of first and second transmissive electrodes and with one driving voltage. Additionally, a mono-cell gap may be used in a transflective-type LCD device instead of the multi-cell gap which is used for controlling different retardations. Therefore, costs of a manufacturing process may be reduced and productivity may be enhanced. Additionally, the LCD device includes the liquid crystal layer including a liquid crystal medium of which the optical anisotropy is altered due to an electric field. Therefore, the viewing angle and the response time of the LCD device may be enhanced.

The foregoing is illustrative of the present invention and is not to be construed as limiting thereof. Although exemplary embodiments of the present invention have been described, those skilled in the art will readily appreciate that many modifications are possible without materially departing from the novel teachings of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to exemplary embodiments disclosed, and that modifications to the disclosed example embodiments, as well as other embodiments, are intended to be included within the scope of the appended claims. The present invention is defined by the following claims, with equivalents of the claims to be included therein.

What is claimed is:

1. A display substrate comprising:
a base substrate comprising a transmissive area and a reflective area;
an insulation layer being formed on the base substrate to have an embossed pattern in correspondence with the transmissive area;
a first pixel electrode comprising a first transmissive electrode formed on the insulation layer of the embossed pattern in correspondence with the transmissive area, and a first reflective electrode formed on the base substrate in correspondence with the reflective area; and
a second pixel electrode comprising a second transmissive electrode formed on the insulation layer of the embossed pattern in correspondence with the transmissive area, and a second reflective electrode formed on the base substrate in correspondence with the reflective area.

2. The display substrate of claim 1, further comprising a color filter layer formed on the base substrate in correspondence with the transmissive area and the reflective area, respectively, wherein the insulation layer is formed on the color filter corresponding to the transmissive area.

3. The display substrate of claim 2, further comprising a reflective layer being disposed between the base substrate and the color filter layer in correspondence with the reflective area.

4. The display substrate of claim 1, wherein the first transmissive electrode and the second transmissive electrode are adjacent to each other, and the first reflective electrode and the second reflective electrode are adjacent to each other.

5. The display substrate of claim 1, wherein each of the first reflective electrode and the second reflective electrode has a bar shape.

6. The display substrate of claim 1, wherein the first pixel electrode and the second pixel electrode are connected to different switching elements.

7. The display substrate of claim 1, wherein the insulation layer is a color filter layer comprising an embossed pattern in correspondence with the transmissive area and a flat portion in correspondence with the reflective area.

8. The display substrate of claim 7, wherein a thickness of the color filter layer corresponding to the transmissive area is substantially the same as a thickness of the color filter corresponding to the reflective area.

9. The display substrate of claim 7, further comprising a reflective layer being disposed between the base substrate and the color filter layer corresponding to the reflective area.

10. A method of manufacturing a display substrate, the method comprising:
providing a base substrate comprising a transmissive area and a reflective area;
forming an insulation layer comprising an embossed pattern on the base substrate in correspondence with the transmissive area;
forming a first pixel electrode comprising a first transmissive electrode on the insulation layer of the embossed pattern in correspondence with the transmissive area, and a first reflective electrode formed on the base substrate in correspondence with the reflective area; and
forming a second pixel electrode comprising a second transmissive electrode on the insulation layer of the embossed pattern in correspondence with the transmissive area, and a second reflective electrode formed on the base substrate in correspondence with the reflective area.

11. The method of claim 10, further comprising forming a color filter layer on the base substrate in correspondence with the transmissive and reflective areas,
wherein the insulation layer is formed in an area of the color filter layer.

12. The method of claim 11, further comprising disposing a reflective layer between the base substrate and the color filter layer in correspondence with the reflective area.

13. The method of claim 10, wherein the insulation layer is a color filter layer comprising an embossing pattern in correspondence with the transmissive area and a flat portion in correspondence with the reflective area.

14. The method of claim 13, wherein a thickness of the color filter layer corresponding to the transmissive area is substantially the same as a thickness of the color filter layer corresponding to the reflective area.

15. The method of claim 10, wherein the first pixel electrode and the second pixel electrode are connected to different switching elements.

16. A liquid crystal display (LCD) device comprising:
a display substrate comprising a base substrate comprising a transmissive area and a reflective area, an insulation layer having an embossed pattern in correspondence with the transmissive area being formed on the base substrate, a first pixel electrode comprising a first transmissive electrode formed on the embossed pattern and a first reflective electrode formed on the base substrate in correspondence with the reflective area, and a second pixel electrode comprising a second transmissive electrode formed on the embossed pattern and second reflective electrode on the base substrate in correspondence with the reflective area;
an opposite substrate facing the display substrate; and
a liquid crystal layer disposed between the opposite substrate and the display substrate, the liquid crystal layer comprising a liquid crystal medium.

17. The LCD device of claim 16, wherein a cell gap of the liquid crystal layer corresponding to the transmissive area is substantially the same as a cell gap of the liquid crystal layer corresponding to the reflective area.

18. The LCD device of claim 16, wherein the liquid crystal medium is in an optical isotropic state when an electric field is not applied between the first pixel electrode and the second pixel electrode, and the liquid crystal medium is in an optical anisotropic state when an electric field is applied between the first pixel electrode and the second pixel electrode.

19. The LCD device of claim 16, wherein a magnitude of an electric field formed between the first pixel electrode and the second pixel electrode corresponding to the transmissive area is about twice that of an electric field formed between the first pixel electrode and the second pixel electrode corresponding to the reflective area.

20. The LCD device of claim 16, wherein a retardation of the liquid crystal layer corresponding to the transmissive area is about half that of the liquid crystal layer corresponding to the reflective area.

* * * * *